United States Patent [19]

Cook

[11] 3,716,523

[45] Feb. 13, 1973

[54] LOW CONCENTRATION STANNOUS CARBOXYLATE CATALYSIS OF POLYESTERIFICATION

[75] Inventor: William H. Cook, Bloomfield Hills, Mich.

[73] Assignee: Basf Wyandotte Corporation, Wyandotte, Mich.

[22] Filed: Oct. 21, 1970

[21] Appl. No.: 82,848

[52] U.S. Cl............260/75 M, 260/75 R, 260/75 NK
[51] Int. Cl. .............................................C08g 17/003
[58] Field of Search..........................260/75 M, 75 R

[56] References Cited

UNITED STATES PATENTS

| | | |
|---|---|---|
| 3,057,824 | 10/1962 | Le Bras et al. ........................260/75 |
| 3,079,368 | 2/1963 | Lundberg................................260/75 |
| 3,162,616 | 12/1964 | Dombrow et al.......................260/75 |
| 3,194,791 | 7/1965 | Wilson et al............................260/75 |
| 3,491,143 | 1/1970 | Kremer et al..........................260/475 |
| 3,185,670 | 5/1965 | McKinney...............................260/75 |

Primary Examiner—Melvin Goldstein
Attorney—Robert E. Dunn, Joseph D. Michaels, Robert M. Phipps and Bernhard R. Swick

[57] ABSTRACT

A method is provided for making a polyester having an acid number of less than 1 which involves heating a polyhydric alcohol and a polycarboxylic acid in the absence of a catalyst until an acid number of 30 or less is obtained and then continuing the esterification in the presence of a stannous salt of a carboxylic acid until the acid number is near zero.

8 Claims, No Drawings

LOW CONCENTRATION STANNOUS CARBOXYLATE CATALYSIS OF POLYESTERIFICATION This invention relates generally to polyesters and more particularly to an improved process for making polyesters of low acid number.

It has been proposed before to prepare polyesters by reacting a polyhydric alcohol with a polycarboxylic acid. Such polyesters may be reacted with organic polyisocyanates to make polyurethane plastics. The molecular weight of the polyester is important in the manufacture of polyurethanes. The conventional polyesters are not pure compounds of a given molecular weight but on the contrary are mixtures of esters of various molecular weights and the molecular weight value usually designated is an average value. The physical properties of a polyurethane are affected by the molecular weight distribution of a polyester and by the presence or absence of certain side reaction products which may be formed during the esterification process. The heretofore commercially available polyesters have an acid number of 1 or higher and frequently do not produce a polyurethane having optimum hydrolytic stability and physical properties at both relatively high temperatures and relatively low temperatures.

One process which will produce polyesters which sometimes have an acid number of 1 or less is disclosed in U.S. Pat. No. 3,162,616. This process uses from about 0.0005 to 0.01 mole tin catalyst per 1,000 grams of polyester. Such quantities of catalyst often affect the subsequent reaction between the polyester and organic polyisocyanate, making it very difficult to properly control the reaction and to consistently produce a polyurethane of uniform composition and physical properties particularly if the polyurethane is one processable by thermoplastic shaping methods.

It is therefore an object of this invention to provide a process for producing polyesters of improved composition and having an acid number of 0.5 or below. Another object of the invention is to provide a polyester adapted to be reacted with an organic polyisocyanate to produce a polyurethane having improved properties. A further object of the invention is to provide an improved process for making polyesters by esterifying a polyhydric alcohol and a polycarboxylic acid or anhydride thereof under conditions which produce a more uniform and more reproducible product. Still another object of the invention is to provide an improved catalytic process for making polyesters suitable for reaction with an organic polyisocyanate to make a polyurethane.

The foregoing objects and others are accomplished in accordance with this invention, generally speaking, by reacting a polyhydric alcohol with a polycarboxylic acid or anhydride thereof to produce a product having an acid number of from about 20 to about 30 and then further reacting the components of the reaction mixture in the presence of at least about 5 parts per million of a stannous salt of a carboxylic acid under vacuum while continuously removing water and avoiding any substantial loss of polyhydric alcohol. It is preferred to esterify the polycarboxylic acid and polyhydric alcohol under superatmospheric pressure of at least about 14.5 pounds per square inch gauge until the temperature of the reaction mixture has reached the maximum level desired, i.e. 170°–220° C. and then to reduce the pressure below atmospheric and to continue the esterification under vacuum in the presence of the stannous salt catalyst until the acid number is 1 or less and, preferably, is 0 to 0.5. The temperature should not exceed about 220° C. at any time during the esterification in order to avoid the formation of cyclic products and other undesirable side reaction products. The hydroxyl number will vary with the molecular weight and functionality of the polyester but will usually be from about 35 to about 350.

A temperature of at least about 170° C. is required to provide a sufficiently rapid rate of esterification of the last 20 to 30 percent of the carboxylic acid. Water and oxygen deleteriously affect the catalyst. It is therefore important to maintain the pressure as low as the esterification equipment will permit throughout the catalytic esterification to accelerate water removal. An efficient fractional distillation column should be used to permit rapid removal of water as it is formed without any substantial loss of polyhydric alcohol. It is preferred that the gauge pressure in the vacuum receiver during the esterification in the presence of the stannous salt catalyst be 35 millimeters of mercury or less. The total amount of stannous salt catalyst used during the entire esterification process should not exceed about 100 parts per million parts polyester in order to avoid the catalyst affecting the reaction of the polyester with an organic polyisocyanate if it is used to make a polyurethane.

As indicated hereinbefore, the catalyst should not be mixed with the reaction mixture until the acid number is below about 30 in order to avoid quickly destroying the catalyst. The rate of water formation increases immediately upon the addition of the catalyst. In order to obtain best results, the catalyst is added continuously after an acid number of about 30 is reached until the acid number is 0.5 or less in an amount which insures that at least 5 parts active catalyst per million parts polyester are present at all time. Alternately, the catalyst can be added incrementally, usually in amounts of about 10 to 20 parts per million, to maintain the desired amount of active catalyst in the reaction mixture. It is preferred to maintain a concentration of about 20 parts active stannous salt per million parts polyester during the catalytic esterification. The total amount of catalyst required will vary depending upon the efficiency of the water removal. The less efficient the water removal, the more catalyst required.

Although the stannous salt catalyst is a very active direct esterification catalyst and acts as such at least to some extent when first added, it is also of primary importance as a transesterification catalyst. By maintaining the catalyst concentration specified herein and by operating under the temperature and pressure conditions set forth above, it is possible to use stoichiometric amounts of the polyhydric alcohol or only a slight excess in equipment which will efficiently remove the water without excessive loss of polyhydric alcohol. During the catalytic part of the process, low molecular moieties react by transesterification with higher molecular moieties with the result that a polyester having a narrower molecular weight distribution is produced. Since it is not necessary to use a large excess of polyhydric alcohol to produce a low acid number and the desired hydroxyl number, distillation of large quantities of polyhydric alcohol is avoided. Furthermore, a reproducible low concentration of unreacted polyhydric alcohol in the final polyester polyol product is obtained.

It is preferred to operate at pressures above atmospheric until the esterification reaction is 70 to 80 percent complete because the higher the pressure the greater the difference in boiling points of water and polyhydric alcohol and the greater the ease of separating the two by fractional distillation. Furthermore, at a given rate of distillation of water, the efficiency of a fractional distillation column is improved by the reduced vapor velocity resulting from increased pressure. Moreover, because of the applied pressure the percentage of polyhydric alcohol which has been esterified is, at any time, greater relative to the amount of water distilled from the reaction mixture than would be the case if the reaction was being conducted at ambient pressure. Consequently, the mole fraction of polyhydric alcohol in the vapor leaving the reaction mixture is reduced throughout the superatmospheric pressure distillation, and the overall efficiency of the separation of water from polyhydric alcohol is increased. The rate of esterification is not reduced appreciably by the applied pressure. It is preferred that the pressure be about 20 p.s.i.g. or higher until the maximum desired reaction temperature has been obtained. Nitrogen, argon or any other inert gas may be introduced into the reactor to regulate the applied pressure at the level desired.

It is advantageous to provide heating which avoids excessive surface temperatures. It is preferred that the heat exchange surfaces in contact with the reaction mixture be not substantially above 220° C. to avoid localized over-heating of the reaction mixture. Any suitable means for heating the reaction mixture may be used, such as a jacketed tank with heated oil pumped through the jacket.

Any suitable stannous salt of a carboxylic acid may be used as the catalyst. Preferably, the catalyst is a stannous salt of a carboxylic acid having from two to 18 carbon atoms. Stannous 2-ethylhexoate and stannous n-octoate are preferred. Other suitable stannous salts are stannous adipate, stannous oxalate, stannous succinate, stannous phthalate, stannous benzoate, stannous naphthenate, stannous acetate, stannous butyrate, stannous oleate, stannous hexoate and the like. These catalysts when used in quantities of 100 parts per million parts polyester or less accelerate the esterification and enable the preparation of a polyester with minimum spread in molecular weight distribution and an acid number of 0.5 or less without adversely effecting the reactivity of the polyester with an organic polyisocyanate.

The process provided by the invention can be used to esterify many polycarboxylic acids or anhydrides thereof and polyhydric alcohols with primary and/or secondary hydroxyl groups, such as, for example, adipic acid, succinic acid, maleic acid, phthalic acid, terephthalic acid, phthalic acid anhydride, sebacic acid, trimellitic anhydride, trimellitic acid, azelaic acid, isophthalic acid or the like and trimethylol propane, ethylene glycol, diethylene glycol, 1,4-butanediol, 1,3-butylene glycol, triethylene glycol, 1,6-hexanediol, pentaerthyritol, mannitol, sucrose, sorbitol and the like. The proper selection of polycarboxylic acid or anhydride and polyhydric alcohol is based on considerations known in the art. However, in making polyesters for reaction with an organic polyisocyanate to produce high-performance elastomers, linear polyesters are preferred. Adipic acid and ethylene glycol or 1,4-butanediol are most often used in such applications. Polyesters having terminal hydroxyl groups with an average molecular weight of from about 500 to about 3,000 and hydroxyl number of from about 37 to about 225 are preferred for making a polyurethane elastomer.

In order better to describe and further clarify the invention, the following are specific examples thereof. All parts are parts by weight unless otherwise stated.

EXAMPLE I

About 2,950 parts adipic acid and about 1,450 parts ethylene glycol are mixed together in a suitable jacketed vessel provided with a disc turbine agitator adapted to be rotated at from about 35 to about 200 revolutions per minute. Four spaced baffles extend vertically along the inner wall of the vessel. Means are provided for pumping heated oil through the jacket at a temperature of about 10° C. to 25° C. above the desired temperature of the contents of the vessel and to separate water formed during esterification from ethylene glycol. The ethylene glycol drains back into the vessel, while water is condensed and drained from the apparatus. A vacuum pump is provided for maintaining the pressure in the vessel, column and water condenser at 36 millimeters of mercury or lower.

The mixture of adipic acid and ethylene glycol is heated under a blanket of nitrogen at a pressure of about 25 pounds per square inch gauge until the contents of the vessel reaches a temperature of about 210° C. At this point the pressure is gradually reduced to about 35 millimeters. When the acid number is about 20, about 20 parts stannous 2-ethylhexoate per million parts of polyester theoretically produceable from the contents of the vessel are added. Heating is continued to maintain the temperature at about 210° C. Additional charges of 20 p.p.m. stannous 2-ethylhexoate are added to the vessel at intervals when required to maintain a reasonable esterification rate. After heating the contents of the vessel at 36 millimeters of mercury or lower has been continued for about 16 hours, the acid number of the polyester is 0.5. The hydroxyl number is 56 and the molecular weight is about 2,000.

EXAMPLE II

Example I is repeated except that a 1 percent solution of stannous 2-ethylhexoate in toluene containing a total of about 80 parts per million of stannous 2-ethylhexoate based on the theoretical yield of product is added gradually after the acid number is about 30 as the contents of the vessel are heated under vacuum until the product has an acid number of 0.18 and a hydroxyl number of 55.2.

EXAMPLE III

The process of Example I is repeated except about 2,332 parts adipic acid and about 1,843 parts diethylene glycol are mixed together. After about 21 hours heating with the catalyst, a polyester is obtained having an acid number of about 0.3 and the hydroxyl number is about 45.

EXAMPLE IV

The process of Example I is repeated except about 1,324 parts adipic acid, about 1,216 parts trimethyol propane and about 1,760 parts tetraethylene glycol are mixed together. A polyester having an acid number of about 0.4 and a hydroxyl number of about 390 is obtained after about 12 hours.

Although the invention has been described in detail in the foregoing for the purposes of illustration, it is to be understood that such detail is solely for that purpose and that those skilled in the art can make alterations therein without departing from the spirit and scope of the invention except as it is limited by the claims.

The embodiments of the invention in which an exclusive property or privilege is claimed are defined as follows:

1. In the preparation of a polyester for use in polyurethane applications wherein residual active catalyst is undesirable by esterification of a polyhydric alcohol and a polycarboxylic acid, the method of making polyesters having an acid number of about 1 or below which comprises heating a mixture of polyhydric alcohol and polycarboxylic acid or anhydride thereof to a temperature of from about 170°C. to about 220°C. at super atmospheric pressure until from about 60 percent to about 80 percent of the polycarboxylic acid has reacted with polyhydric alcohol, reducing the pressure below atmospheric and continuing the reaction until the product has an acid number of about 30 or less, mixing therewith a catalytic amount of a catalyst containing not more than about 100 parts but at least 5 parts of a stannous salt of a carboxylic acid having from two to 18 carbon atoms per million parts polyester while simultaneously maintaining the resulting mixture at a temperature of between about 170°C. and about 220°C. and at a pressure less than atmospheric, and removing water therefrom substantially as rapidly as it is formed while avoiding removal of any substantial amount of polyhydric alcohol until a product having an acid number of 1 or less is obtained.

2. The method of claim 1 wherein the catalyst is mixed with the reaction mixture in a plurality of steps.

3. The method of claim 1 wherein the catalyst is mixed continuously with the reaction mixture between an acid number of about 30 and 1.

4. The method of claim 1 wherein said catalyst is stannous 2-ethylhexoate.

5. The method of claim 1 wherein the pressure after the catalyst has been added is maintained at 35 millimeters of mercury or less.

6. The method of claim 1 wherein the catalyst is added continuously after an acid number of about 30 is reached in an amount which provides at least 5 parts active catalyst per million parts polyester at all times until an acid number of 0.5 or less is reached.

7. The method of claim 6 wherein the catalyst is stannous octoate.

* * * * *

R-207

PO-1050
(5/69)

UNITED STATES PATENT OFFICE
CERTIFICATE OF CORRECTION

Patent No. 3,716,523　　　　　　　　Dated February 13, 1973

Inventor(s)　　William H. Cook

It is certified that error appears in the above-identified patent and that said Letters Patent are hereby corrected as shown below:

Column 6, line 32, insert the following claim:

--8. The method of claim 1 wherein said catalyst is stannous n-octoate.--

Signed and sealed this 3rd day of July 1973.

(SEAL)
Attest:

EDWARD M. FLETCHER, JR.　　　　　　Rene Tegtmeyer
Attesting Officer　　　　　　　　　Acting Commissioner of Patents